(12) United States Patent
Mouline et al.

(10) Patent No.: US 9,740,708 B2
(45) Date of Patent: Aug. 22, 2017

(54) SYSTEMS AND METHODS FOR DISTANCE AND PERFORMANCE BASED LOAD BALANCING

(71) Applicant: Everbridge, Inc., Glendale, CA (US)

(72) Inventors: Imad Mouline, Braintree, MA (US); William Ryan Breen, Melrose, MA (US); Timothy Frans Wills, Newton, MA (US); Paul Smith, Guernsey (GB)

(73) Assignee: Everbridge, Inc., Pasadena, CA (US)

( * ) Notice: Subject to any disclaimer, the term of this patent is extended or adjusted under 35 U.S.C. 154(b) by 32 days.

(21) Appl. No.: 13/834,148

(22) Filed: Mar. 15, 2013

(65) Prior Publication Data

US 2013/0297596 A1    Nov. 7, 2013

Related U.S. Application Data

(60) Provisional application No. 61/641,270, filed on May 1, 2012.

(51) Int. Cl.
| | |
|---|---|
| *G06F 7/00* | (2006.01) |
| *G06F 17/30* | (2006.01) |
| *H04L 29/08* | (2006.01) |
| *H04L 29/12* | (2006.01) |

(52) U.S. Cl.
CPC .... *G06F 17/30241* (2013.01); *G06F 17/3087* (2013.01); *H04L 61/1511* (2013.01); *H04L 61/609* (2013.01); *H04L 67/1008* (2013.01); *H04L 67/1021* (2013.01)

(58) Field of Classification Search
CPC ........... G06F 17/30241; G06F 17/3087; H04L 61/1511; H04L 61/609; H04L 67/1021; H04L 67/1008
USPC .......................................................... 707/724
See application file for complete search history.

(56) References Cited

U.S. PATENT DOCUMENTS

| | | | |
|---|---|---|---|
| 5,436,965 | A | 7/1995 | Grossman et al. |
| 5,761,272 | A | 6/1998 | Williams et al. |
| 5,937,165 | A | 8/1999 | Schwaller et al. |
| 6,038,544 | A | 3/2000 | Machin et al. |
| 6,101,537 | A | 8/2000 | Edelstein et al. |
| 6,160,871 | A | 12/2000 | DuRee et al. |

(Continued)

OTHER PUBLICATIONS

International Search Report and Written Opinion issued for PCT/US2013/0383366, dated Oct. 4, 2013, 10 pages.

(Continued)

*Primary Examiner* — Kris Mackes
*Assistant Examiner* — Lin Lin Htay
(74) *Attorney, Agent, or Firm* — Norton Rose Fulbright US LLP (57) ABSTRACT

Systems and methods for a DNS management system utilize a distance-based and/or a performance-based A record. A DNS management system of embodiments receives a request from a client for an IP address associated with a domain name. A database of IP address location records is queried to determine a geographic location of the client in operation according to embodiments. An A record corresponding to the geographically closest available server node may thereafter be delivered to the client. A system operable according to embodiments may additionally or alternatively monitor the performance of available servers and deliver an A record corresponding to the best performing local server.

17 Claims, 4 Drawing Sheets

(56) References Cited

U.S. PATENT DOCUMENTS

| | | | |
|---|---|---|---|
| 6,198,739 B1 | 3/2001 | Neyman et al. | |
| 6,226,360 B1 | 5/2001 | Goldberg et al. | |
| 6,269,150 B1 | 7/2001 | Herrbach et al. | |
| 6,292,909 B1 | 9/2001 | Hare | |
| 6,324,492 B1 | 11/2001 | Rowe | |
| 6,421,424 B1 | 7/2002 | Creamer et al. | |
| 6,519,228 B1 | 2/2003 | Creamer et al. | |
| 6,560,634 B1* | 5/2003 | Broadhurst | 709/203 |
| 6,587,543 B1 | 7/2003 | Howard et al. | |
| 6,597,694 B1 | 7/2003 | Fondekar et al. | |
| 6,724,865 B1 | 4/2004 | Michel et al. | |
| 6,795,395 B1 | 9/2004 | Khasnabish | |
| 6,795,858 B1* | 9/2004 | Jain et al. | 709/226 |
| 6,845,352 B1 | 1/2005 | Wang | |
| 7,596,484 B1 | 9/2009 | Patel et al. | |
| 7,653,700 B1 | 1/2010 | Bahl et al. | |
| 7,680,250 B1 | 3/2010 | Zilles et al. | |
| 8,886,750 B1 | 11/2014 | Mutz et al. | |
| 8,966,036 B1 | 2/2015 | Asgekar et al. | |
| RE45,606 E | 7/2015 | Neyman et al. | |
| 9,118,764 B2 | 8/2015 | Mistry | |
| 2001/0052016 A1* | 12/2001 | Skene et al. | 709/226 |
| 2002/0012428 A1 | 1/2002 | Neyman et al. | |
| 2002/0065922 A1* | 5/2002 | Shastri | H04L 29/06 709/227 |
| 2002/0099616 A1* | 7/2002 | Sweldens | 705/26 |
| 2002/0099818 A1* | 7/2002 | Russell | H04L 67/02 709/224 |
| 2002/0176543 A1 | 11/2002 | Creamer et al. | |
| 2003/0101278 A1* | 5/2003 | Garcia-Luna-Aceves et al. | 709/240 |
| 2003/0195984 A1* | 10/2003 | Zisapel | G06F 9/505 709/238 |
| 2004/0008825 A1 | 1/2004 | Seeley et al. | |
| 2004/0210670 A1 | 10/2004 | Anerousis et al. | |
| 2006/0036761 A1 | 2/2006 | Amra et al. | |
| 2006/0117038 A1* | 6/2006 | Toebes et al. | 707/100 |
| 2007/0050522 A1* | 3/2007 | Grove et al. | 709/246 |
| 2007/0165542 A1 | 7/2007 | Shin et al. | |
| 2007/0294419 A1 | 12/2007 | Ulevitch | |
| 2008/0046267 A1 | 2/2008 | Romano et al. | |
| 2009/0060149 A1 | 3/2009 | Pavelko et al. | |
| 2009/0112586 A1 | 4/2009 | Williams | |
| 2009/0122697 A1* | 5/2009 | Madhyasha | H04L 12/2697 370/229 |
| 2009/0129316 A1* | 5/2009 | Ramanathan | H04L 45/123 370/328 |
| 2009/0132543 A1* | 5/2009 | Chatley et al. | 707/10 |
| 2009/0132648 A1 | 5/2009 | Swildens et al. | |
| 2009/0147926 A1 | 6/2009 | Fahrenthold et al. | |
| 2009/0190725 A1 | 7/2009 | Yang et al. | |
| 2009/0307094 A1 | 12/2009 | Manos | |
| 2009/0327489 A1* | 12/2009 | Swildens et al. | 709/224 |
| 2010/0211673 A1* | 8/2010 | Kosbab | H04L 41/5009 709/224 |
| 2010/0223364 A1 | 9/2010 | Wei | |
| 2010/0291943 A1* | 11/2010 | Mihaly | H04L 29/12066 455/450 |
| 2011/0054893 A1 | 3/2011 | Williams et al. | |
| 2011/0055312 A1 | 3/2011 | Purdy, Sr. | |
| 2011/0093522 A1 | 4/2011 | Chen et al. | |
| 2011/0137973 A1 | 6/2011 | Wei et al. | |
| 2011/0282973 A1* | 11/2011 | Josefsberg et al. | 709/219 |
| 2012/0030274 A1 | 2/2012 | Christenson et al. | |
| 2012/0079115 A1 | 3/2012 | Richardson et al. | |
| 2013/0055394 A1 | 2/2013 | Beresnevichiene et al. | |
| 2013/0085868 A1 | 4/2013 | Jordan et al. | |
| 2013/0129060 A1 | 5/2013 | Gopalakrishnan et al. | |
| 2013/0136248 A1 | 5/2013 | Kaiser-Nyman et al. | |
| 2014/0278264 A1 | 9/2014 | Bukhin et al. | |

OTHER PUBLICATIONS

International Search Report and Written Opinion issued for PCT/US2013/039709, dated Dec. 2, 2013, 11 pages.

Pingdom Transaction Monitoring, https://www.pingdom.com/product/transaction-monitoring (last visited Feb. 13, 2017).

Dynatrace, Case Study: Lucky Vitamin, at p. 2, available online at https://www.dynatrace.com/company/customers/lucky-vitamin/ (last visited Feb. 13, 2017).

CircleID, Neustar Buys Webmetrics, http://www.circleid.com/posts/81179_neustar_buys_webmetrics/ (last visited Feb. 13, 2017).

* cited by examiner

| Name | Type | Value |
|---|---|---|
| foo.example.com. | CNAME | bar.example.com. |
| bar.example.com. | A | 192.0.2.23 |

SYSTEMS AND METHODS FOR DISTANCE AND PERFORMANCE BASED LOAD BALANCING

CROSS-REFERENCE TO RELATED APPLICATIONS

The present application claims priority to U.S. Provisional Patent Application No. 61/641,270, entitled "Systems And Methods For Distance And Performance Based Load Balancing", filed May 1, 2012, and is related to U.S. patent application Ser. No. 13/834,249 filed Mar. 15, 2013 entitled "Systems and Methods for Cloud-Aware Domain Name System Management," filed concurrently herewith, and U.S. patent application Ser. No. 13/834,068 filed Mar. 15, 2013, issued as U.S. Pat. No. 9,391,855 on Jul. 12, 2016, entitled "Systems and Methods for Stimulating a Notification System," filed concurrently herewith, the disclosures of which are hereby incorporated herein by reference.

FIELD OF THE INVENTION

The present disclosure generally relates to DNS management, and more particularly to a DNS management system which provides routing distance and/or performance-based DNS records.

BACKGROUND

The Domain Name System (DNS) is a hierarchical distributed naming system for computers, services, or any resource connected the Internet or a private network. A Domain Name Service translates queries for domain names (e.g., yourdomain.com) into IP addresses for the purpose of locating resources worldwide. Whereas domain names are generally understandable and easily remembered by humans, IP addresses are less memorable for humans. For example, the domain name www.example.com translates to the addresses 192.0.43.10 (Internet Protocol version 4 (IPv4)) and 2620:0:2d0:200::10 (Internet Protcol version 6 (IPv6)). The DNS makes it possible to assign domain names to groups of network resources in a meaningful way, and independent of the resources' physical locations.

The DNS implements a distributed, hierarchical, and redundant database for information associated with Internet domain names and IP addresses. In these domain servers, different record types are used. Two of these record types are an address record (A or AAAA records) and a canonical name record (CNAME record). An A record is most commonly used to map hostnames (i.e., domain names associated with at least one IP address) with the IP address of the host. Thus, given a hostname, an A record will return an IP address. A CNAME record is an alias of a first domain name for a second domain name. Given the first domain name, a CNAME record will return the second domain name. The second domain name can then be used to look up a further domain name (if another CNAME record exists as an alias for the further domain name) or an IP address (if an A record exists for the second domain name). It should be understood that other record types exist as well. For instance, a delegation name record (DNAME record) is similar to a CNAME record, but is an alias for a domain name and all of its subdomain names.

Figure 1:
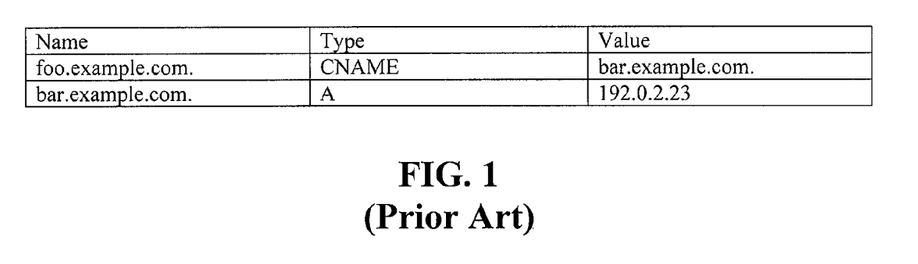
FIG. 1 illustrates an example set of resource records, according to the prior art.

A simple example of a set of DNS records is illustrated in FIG. 1. When a lookup for "foo.example.com" is performed, the DNS resolver will encounter the CNAME record with a value of "bar.example.com." The resolver will then restart the lookup using "bar.example.com" and find the A record with a value of "192.0.2.23." Thus, the resolver will return the IP address 192.0.2.23.

DNS issues arise in the context of cloud hosted services. For instance, cloud applications are generally distributed across multiple locations to improve response times and resiliency in the case of failure. From the application's perspective, it does not automatically know where it is distributed, and where the closest name server is. It is frequently the case that an enterprise is unwittingly resolving all DNS queries on a name server thousands of miles away, adding precious seconds to the query latency. This can drastically affect the enterprise's bottom line. For instance, a study by Amazon found that every 100 ms of latency costs it 1% in sales. Similarly, Google reports that an extra half-second in search page generation time reduces traffic by 20%.

SUMMARY

The present invention is directed to systems and methods which provide DNS management operable to implement geographic redirection of end users, such as to facilitate decreased latency and/or load balancing with respect to resources distributed across multiple locations. Particularly, the system of embodiments comprises one or more DNS servers which are capable of redirecting users to country-based content delivery networks (CDNs) or the closest cloud region, availability zone, or instance, using routing via distance-based and/or performance-based ordering of DNS records. In an embodiment, the distance-based routing technique is based on a geographical distance between a server and a client.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The DNS namespace is divided in hierarchical tree-like fashion into cascading lower-level domains that are ordered as a reverse-prioritized concatenation of names. Each level is separated by a period and the levels descend in priority from right to left (e.g., sub2.sub1.yourcompany.com). Administratively, each level or node in the hierarchy represents a potential boundary of authority for management of the name space. The authority over each level of the name space is delegated to an entity, such as a top-level country's domain registry, or a company or individual registered to use a given sub-domain. These administrative spaces or portions of the DNS are called "DNS zones." DNS zones may consist of only one domain, or may comprise many domains and sub-domains, depending on the administrative authority delegated to the manager. DNS zones are expressed by database elements (e.g., zone files) that are used to technically administer a zone in a DNS management system, for example, using resource records, as discussed above.

Figure 2:
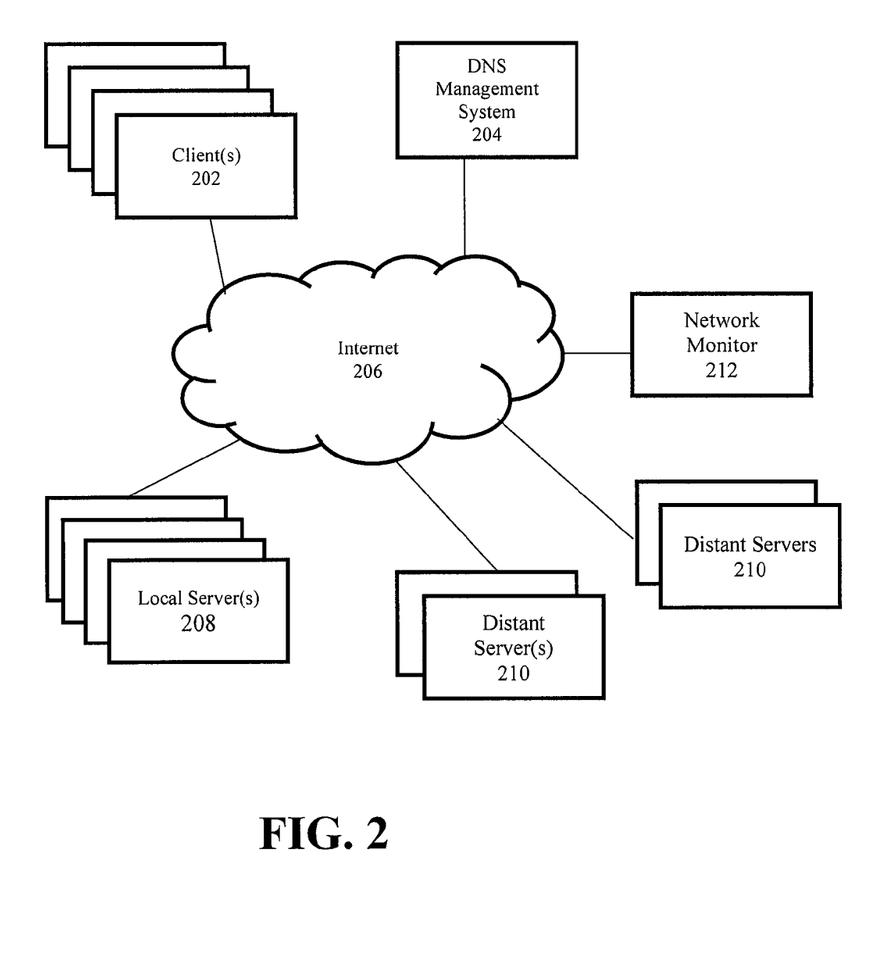
FIG. 2 is a block diagram representation of a network and an embodiment of the present invention.

In an embodiment, a DNS management system for a DNS zone is provided which utilizes a novel routing algorithm via distance-based and/or performance-based DNS record ordering. Referring to FIG. 2, the DNS management system 204 is coupled through a network (e.g., Internet 206) to one or more clients, or users, 202, one or more geographically local servers 208, and one or more geographically distant servers 210. The DNS management system 204 may comprise one or more servers, hardware processors, memories, applications, software modules, and/or any number of other hardware or software resources. A network monitor 212 may be coupled to the network 206 to monitor the performance of the local servers 208 and distant servers 210.

Using a distance-based ordering of DNS records, visiting users may be sent to the geographically closest server node, regardless of their country of origin. In other words, the DNS record (e.g., A or AAAA record) returned to the user is based on the user's geographic location. This provides geographic optimization for load-balancing groups. The distance-based algorithm for selecting DNS records can be used in place of conventional techniques to select and provide DNS records corresponding to load-balancing groups which are geographically closest to the end user, in a completely hands off manner. In an embodiment, load-balancing groups which are equidistant or near-distant to each other can be selected in a round-robin fashion.

The IP address of the servers being serviced by the DNS management system are often known to the system from their associated DNS entries. Furthermore, the IP address of the querying client is also often known to the DNS management system. By accessing a database of IP address location records (which may comprise millions of such records), the DNS management system can determine with a high degree of accuracy the geographic locations of both the requested server and the requesting client. The geographic location information may also be obtained from geo-location information provided by a user device (e.g., GPS functionality). In an embodiment, the DNS management system can calculate an approximate distance between the client and server based on latitude and longitude coordinates.

Conventional DNS providers approximate the locations of users based on which server the user lands on, due to performance overhead. For instance, many conventional providers use the Internet's natural routing to determine if a user is local to a specific server, and separate the Internet into "zones" based on this routing. However, this natural zone routing technique is often inaccurate since providers will often choose financially economical routes for their data, rather than the closest and highest performance routes, which typically cost more. For example, a user located on the West Coast may be routed to a DNS server located on the East Coast for financial reasons, even though there are closer DNS servers. In the conventional natural zone routing technique, the DNS server will inaccurately assume that the user is located on the East Coast and return DNS records, such as an A record, associated with an East Coast server, even though there may be a closer and better performing server for the user.

In an embodiment, the DNS management system uses a distance-based routing method to determine which DNS records to deliver to a user. In this method, the DNS management system stores the geographic locations of the IP addresses referenced in the resource records in a memory of the DNS server. This means that the overhead is small and scalable. In an embodiment, the disclosed DNS management system uses a lookup table of IP addresses and their corresponding geographic ownership records to determine the geographic location of the user. This information is used to determine the geographically closest server node. The lookup table may be held in memory in a special, compact, binary format to enable very fast lookup.

Rather than making assumptions regarding the location of the user based on which server receives a request like the conventional natural zone routing techniques, the distance-based routing technique relies upon accurate information regarding the geographical location of the user. Thus, the disclosed distance-based routing method provides a more accurate, although generally significantly more complex and more load-intensive, means for routing traffic than conventional natural zone routing methods.

Figure 3:
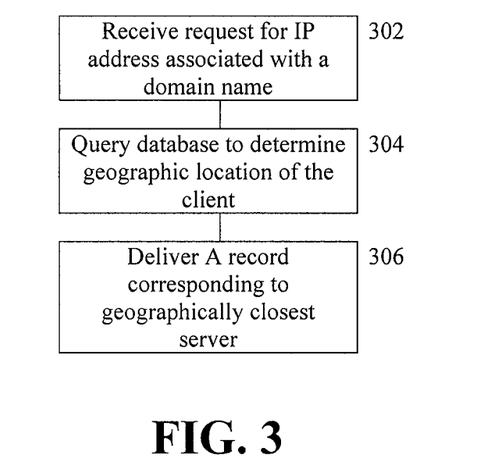
FIG. 3 is a flowchart of a process for delivering an IP address in accordance with an embodiment of the present invention.

FIG. 3 illustrates the distance-based routing method of translating queries for domain names into IP addresses, which may be performed in the processor and logic of the DNS management system 204 shown in FIG. 2. In step 302, a request is received from a client for an IP address associated with a domain name. The client has an associated client IP address. In step 304, a database of IP address location records is queried to determine a geographic location of the client. Alternatively, the geographic location of the client may be determined based on geo-location information provided by a user device. Based on the location of the client, a list of DNS records of available servers is formed according to geographic proximity. In step 306, the ordered list of DNS record is served to the client. In an embodiment, the DNS management system calculates a geographic distance between the client and server based on latitude and longitude coordinates to determine the geographic proximity to available servers.

Figure 4:
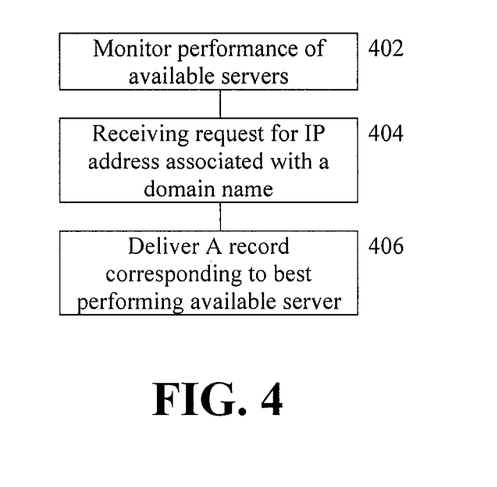
FIG. 4 is a flowchart of a process for delivering an IP address in accordance with another embodiment of the present invention.

In another embodiment illustrated in FIG. 4, the DNS management system serves DNS records which are ordered based on the performance of available servers. The method illustrated in FIG. 4 may be performed in the processor and logic of the DNS management system 204 shown in FIG. 2. As seen in FIG. 4, the performance of locally available servers is monitored to determine the performance of available servers (step 402). The performance may be measured using conventional metrics, such as availability, response time, etc. In an embodiment, the performance of potential local servers may be monitored using metrics obtained using a network monitoring server 212 or an application which periodically probes the available servers. The network monitoring server may be an external performance monitoring source (e.g., Pingdom, Gomez, and Neustar Webmetrics), which monitors performance as seen by clients, therefore taking into account actual routing, network node performance, etc.

A request for an IP address associated with a domain name is received from a client (step 404), and a list of DNS records sorted in order of performance is delivered to the requesting client (step 406).

Figure 5:
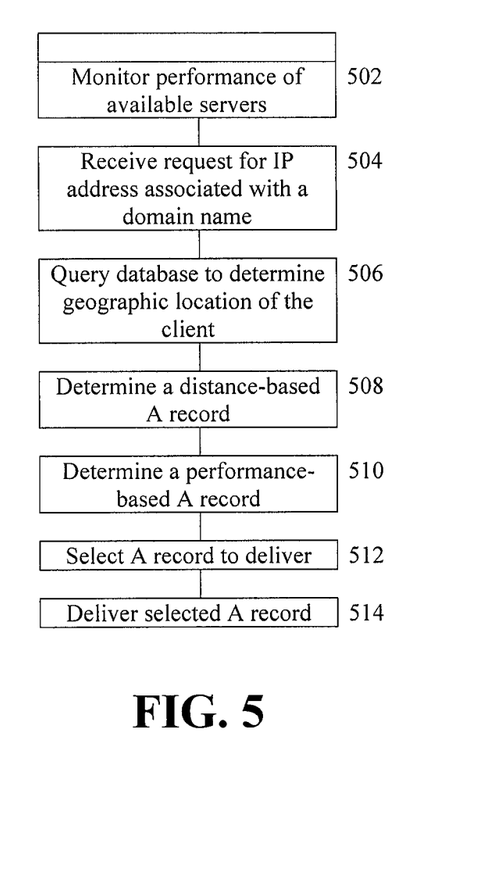
FIG. 5 is a flowchart of a process for delivering an IP address in accordance with yet another embodiment of the present invention.

The performance-based DNS records may be used instead of or in addition to distance-based DNS records, as illustrated in FIG. 5. The method of FIG. 5 may be performed in the processor and logic of the DNS management system 204 shown in FIG. 2. In step 502, the performance of available servers is monitored to determine the performance of available servers in the same manner as previously described. In step 504, a request is received from a client for an IP address associated with a domain name. The client has an associated client IP address. In step 506, the client IP address is used to query a database of IP address location records to determine a geographic location of the client. In step 508, the geographic location is used to determine an ordered list of distance-based routing DNS records corresponding to the geographically closest server node.

In step 510, the DNS management system selects whether to deliver the distance-based DNS records or the performance-based DNS records. The selection of which record to deliver can be based on certain criteria, such as performance, cost, load balancing, etc. For instance, in one embodiment, the system defaults to providing distance-based DNS records and delivers the performance-based DNS records if the monitoring software indicates that a more geographically distant server will provide better performance to the client. In this instance, the performance-based DNS records may be selected only if it improves performance by a certain threshold as compared to the distance-based routing DNS records. For instance, the system may deliver the performance-based DNS records only if response time is improved by a certain amount. Alternatively, the system may select the performance-based DNS records in view of other considerations, such as load balancing and/or financial issues, even if the distance-based DNS records would deliver equal or better performance than the performance-based DNS records.

In step 512, the DNS management system delivers the selected DNS records to the client.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A distance-based routing method of translating queries for domain names into internet protocol (IP) addresses, comprising:

determining performance information associated with applications hosted by available server nodes, wherein the performance information includes metrics representative of actual routing and performance of the available server nodes as experienced by client devices using the applications hosted by the available server nodes, wherein the metrics representative of the actual routing and performance of the available server nodes as experienced by the client devices include metrics accounting for: 1) actual routing and performance of data exchanged between the client devices and the available server nodes during use of the applications hosted by the available server nodes; and 2) actual routing and performance of data exchanged between the available server nodes and external systems responsive to the data exchanged between the client devices and the available server nodes during use of the applications hosted by the available server nodes;

receiving a request from a client device for an IP address associated with a domain name, the client device having a client IP address;

querying a database of IP address location records to determine a geographic location of the client device;

determining geographic distance to available server nodes based on the geographic location of the client device; and determining a first list of domain name system (DNS) records associated with the available server nodes, wherein the first list of DNS records is ordered based on the geographic proximity of the available server nodes to the geographic location of the client device;

determining a second list of DNS records associated with the available server nodes, wherein the second list of DNS records is ordered based on the performance of the available server nodes as determined by the performance information;

comparing the performance of the server nodes identified in the first list of DNS records and the performance of the server nodes identified in the second list of DNS records to determine whether performance of the server nodes identified in the second list of DNS records provides a threshold performance improvement over the server nodes identified in the first list of DNS records; and delivering the first list of DNS records to the client device when the performance of the server nodes identified in the second list of DNS records does not provide a threshold performance improvement over the server nodes identified in the first list of DNS records; and delivering the second list of DNS records to the client device when the performance of the server nodes identified in the second list of DNS records provides a threshold performance improvement over the server nodes identified in the first list of DNS records.

2. The method of claim 1, further comprising determining a geographic location of the available server nodes based on IP addresses of the available server nodes.

3. The method of claim 1, further comprising calculating an approximate distance between the geographic location of the client device and each of the available server nodes based on latitude and longitude coordinates.

4. The method of claim 1, further comprising delivering DNS records corresponding to equidistant or near equidistant available server nodes in a round-robin fashion.

5. The method of claim 1, wherein the performance of the available server nodes is monitored using a network monitoring server which periodically probes the available server nodes.

6. The method of claim 1, further comprising performing application performance monitoring to determine the performance information associated with the applications hosted by the available server nodes.

7. A non-transitory computer readable medium storing a program causing a computer to execute a process for translating queries for domain names into internet protocol (IP) addresses, the process comprising:

determining performance information associated with applications hosted by available server nodes, wherein the performance information includes metrics representative of actual routing and performance of the available server nodes as experienced by client devices using the applications hosted by the available server nodes, wherein the metrics representative of the actual routing and performance of the available server nodes as experienced by the client devices include metrics accounting for: 1) actual routing and performance of data exchanged between the client devices and the available server nodes during use of the applications hosted by the available server nodes; and 2) actual routing and performance of data exchanged between the available server nodes and external systems responsive to the data exchanged between the client devices and the available server nodes during use of the applications hosted by the available server nodes;

receiving a request from a client device for an IP address associated with a domain name, the client device having a client IP address;

querying a database of IP address location records to determine a geographic location of the client device;

determining geographic distance to available server nodes based on the geographic location of the client device;

determining a first list of domain name system (DNS) records associated with the available server nodes, wherein the first list of DNS records is ordered based on the geographic proximity of the available server nodes to the geographic location of the client device;

determining a second list of DNS records associated with the available server nodes, wherein the second list of DNS records is ordered based on the performance of the available server nodes as determined by the performance information;

comparing the performance of the server nodes identified in the first list of DNS records and the performance of the server nodes identified in the second list of DNS records to determine whether performance of the server nodes identified in the second list of DNS records provides a threshold performance improvement over the server nodes identified in the first list of DNS records; and delivering the first list of DNS records to the client device when the performance of the server nodes identified in the second list of DNS records does not provide a threshold performance improvement over the server nodes identified in the first list of DNS records; and delivering the second list of DNS records to the client device when the performance of the server nodes identified in the second list of DNS records provides a threshold performance improvement over the server nodes identified in the first list of DNS records.

8. The non-transitory computer readable medium of claim 7, wherein the process further comprises calculating an approximate distance between the client device and each of the available server nodes based on latitude and longitude coordinates.

9. The non-transitory computer readable medium of claim 7, wherein the process further comprises delivering DNS records corresponding to equidistant or near-distant available server nodes in a round-robin fashion.

10. The non-transitory computer readable medium of claim 7, wherein the process further comprises determining a geographic location of an available server node based on its associated IP address.

11. The non-transitory computer readable medium of claim 10, wherein the process further comprises selecting an order of the DNS records based on geographic location and performance data.

12. The non-transitory computer readable medium of claim 7, wherein the performance information is received from a network monitoring server which periodically probes the available server nodes.

13. The non-transitory computer readable medium of claim 7, wherein the process further comprises monitoring the performance of the available servers using a network monitoring server which periodically probes the available servers.

14. A system for translating queries for domain names into internet protocol (IP) addresses, the system comprising:

one or more servers, each of the one or more servers comprising a memory and one or more processors communicatively coupled to the memory, wherein each of the one or more servers is configured to perform operations to translate queries for domain names into IP addresses, the operations comprising:

determining performance information associated with applications hosted by available server nodes, wherein the performance information includes metrics representative of actual routing and performance of the available server nodes as experienced by client devices using the applications hosted by the available server nodes, wherein the metrics representative of the actual routing and performance of the available server nodes as experienced by the client devices include metrics accounting for: 1) actual routing and performance of data exchanged between the client devices and the available server nodes during use of the applications hosted by the available server nodes; and 2) actual routing and performance of data exchanged between the available server nodes and external systems responsive to the data exchanged between the client devices and the available server nodes during use of the applications hosted by the available server nodes;

receiving a request from a client device for an IP address associated with a domain name, the client device having a client IP address;

querying a database of IP address location records to determine a geographic location of the client device;

determining geographic distance to available server nodes based on the geographic location of the client device;

determining a first list of domain name system (DNS) records associated with the available server nodes, wherein the first list of DNS records is ordered based on the geographic proximity of the available server nodes to the geographic location of the client device;

determining a second list of DNS records associated with the available server nodes, wherein the second list of DNS records is ordered based on the performance of the available server nodes as determined by the performance information;

comparing the performance of the server nodes identified in the first list of DNS records and the performance of the server nodes identified in the second list of DNS records to determine whether performance of the server nodes identified in the second list of DNS records provides a threshold performance improvement over the server nodes identified in the first list of DNS records; and delivering the first list of DNS records to the client device when the performance of the server nodes identified in the second list of DNS records does not provide a threshold performance improvement over the server nodes identified in the first list of DNS records; and delivering the second list of DNS records to the client device when the performance of the server nodes identified in the second list of DNS records provides a threshold performance improvement over the server nodes identified in the first list of DNS records.

15. The system of claim 14, wherein the operations further comprise:
    selecting the distance-based DNS records as a default; and
    selecting the performance-based DNS records if certain criteria are met.

16. The system of claim 15, wherein said criteria include performance, cost, and availability.

17. The system of claim 14, wherein the operations further comprise receiving the performance information associated with the applications hosted by the available server nodes from an application performance monitoring service provider.

* * * * *